(12) United States Patent
Li et al.

(10) Patent No.: US 11,042,320 B2
(45) Date of Patent: Jun. 22, 2021

(54) PROBLEM DIAGNOSIS IN COMPLEX SAN ENVIRONMENTS

(71) Applicant: International Business Machines Corporation, Armonk, NY (US)

(72) Inventors: Hua Qing Li, Shanghai (CN); Jin Yan Huang, Shanghai (CN); Kai Rong Wang, Shanghai (CN); Xiao Ming Shi, Shanghai (CN); Bo Zou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 16/278,663

(22) Filed: Feb. 18, 2019

(65) Prior Publication Data

US 2020/0264801 A1 Aug. 20, 2020

(51) Int. Cl.
*G06F 11/00* (2006.01)
*G06F 3/06* (2006.01)
*G06F 11/07* (2006.01)

(52) U.S. Cl.
CPC .......... *G06F 3/0653* (2013.01); *G06F 3/0604* (2013.01); *G06F 3/067* (2013.01); *G06F 11/0727* (2013.01)

(58) Field of Classification Search
None
See application file for complete search history.

(56) References Cited

U.S. PATENT DOCUMENTS

| | | | |
|---|---|---|---|
| 6,636,981 B1 | 10/2003 | Barnett et al. | |
| 7,457,871 B2 | 11/2008 | Barsuk | |
| 9,104,572 B1 * | 8/2015 | Thompson | H04L 41/142 |
| 9,542,115 B1 | 1/2017 | Hrischuk et al. | |
| 9,619,311 B2 | 4/2017 | Coronado et al. | |
| 9,772,898 B2 * | 9/2017 | Deshpande | H04L 41/065 |
| 2008/0250042 A1 * | 10/2008 | Mopur | G06F 11/0727 |
| 2011/0314332 A1 * | 12/2011 | Shimada | G06F 11/079 714/26 |

(Continued)

FOREIGN PATENT DOCUMENTS

EP    1115225 A    7/2001

OTHER PUBLICATIONS

ACM database search, Oct. 6, 2020, see attached (Year: 2020).*

(Continued)

*Primary Examiner* — Christopher S McCarthy
(74) *Attorney, Agent, or Firm* — Nelson and Nelson; Daniel P. Nelson

(57) ABSTRACT

A method to more effectively and efficiently diagnose problems in a storage network is disclosed. In one embodiment, such a method includes generating, for a storage network, a resource map that identifies components therein. For each component in the resource map, the method identifies an importance factor that indicates the component's importance in the storage network. When a problem is detected in the storage network, the method identifies, for each component in the resource map, a potential cause factor that indicates how likely the component is to have caused the problem. The method also calculates, for each component in the resource map, a problem responsibility factor to indicate to what extent the component is held responsible for the problem. A corresponding system and computer program product are also disclosed.

20 Claims, 11 Drawing Sheets

(56) References Cited

U.S. PATENT DOCUMENTS

2014/0172919 A1\* 6/2014 Johnston ............. G06F 16/1734
707/797
2015/0149822 A1 5/2015 Coronado et al.

OTHER PUBLICATIONS

Google Scholar/Patents search, Oct. 6, 2020, see attached (Year: 2020).\*
Google Scholar/Patents—text refined (Year: 2021).\*
IBM, "Storage Networking Problem Determination," IP.com No. IPCOM000022539D, Mar. 20, 2004.

\* cited by examiner

| Volume on Host | Related Components | | | | | | | | | |
|---|---|---|---|---|---|---|---|---|---|---|
| | Host | Host Adapter | Host Adapter Port | Multipath Software | Switch Port/w Host | Switch w/Host | Switch Port/w Storage | Switch w/Storage | Host Adapter Port | Storage Server | Storage | Storage Pool |
| Volume 1 | Host 1 | Adapter 1 | Port A | Multipath 1 | Port 1 | Switch 1 | Port 3 | Switch 1 | Port a | Server 1 | Storage 1 | Pool 1 |
| Volume 1 | Host 1 | Adapter 1 | Port B | Multipath 1 | Port 5 | Switch 2 | Port 7 | Switch 2 | Port b | Server 2 | Storage 1 | Pool 1 |
| Volume 2 | Host 1 | Adapter 1 | Port A | Multipath 1 | Port 1 | Switch 1 | Port 3 | Switch 1 | Port a | Server 1 | Storage 1 | Pool 1 |
| Volume 2 | Host 1 | Adapter 1 | Port B | Multipath 1 | Port 5 | Switch 2 | Port 7 | Switch 2 | Port b | Server 2 | Storage 1 | Pool 1 |
| Volume 3 | Host 1 | Adapter 1 | Port A | Multipath 1 | Port 1 | Switch 1 | Port 3 | Switch 1 | Port a | Server 1 | Storage 1 | Pool 2 |
| Volume 3 | Host 1 | Adapter 1 | Port B | Multipath 1 | Port 5 | Switch 2 | Port 7 | Switch 2 | Port b | Server 2 | Storage 1 | Pool 2 |
| Volume 4 | Host 1 | Adapter 1 | Port A | Multipath 1 | Port 1 | Switch 1 | Port 4 | Switch 1 | Port c | Server 3 | Storage 1 | Pool 3 |
| Volume 4 | Host 1 | Adapter 1 | Port B | Multipath 1 | Port 5 | Switch 2 | Port 8 | Switch 2 | Port d | Server 4 | Storage 2 | Pool 3 |
| Volume 5 | Host 2 | Adapter 2 | Port C | Multipath 2 | Port 2 | Switch 1 | Port 4 | Switch 1 | Port c | Server 3 | Storage 2 | Pool 3 |
| Volume 5 | Host 2 | Adapter 2 | Port D | Multipath 2 | Port 6 | Switch 2 | Port 8 | Switch 2 | Port d | Server 4 | Storage 2 | Pool 3 |
| Volume 6 | Host 2 | Adapter 2 | Port C | Multipath 2 | Port 2 | Switch 1 | Port 3 | Switch 1 | Port a | Server 1 | Storage 1 | Pool 2 |
| Volume 6 | Host 2 | Adapter 2 | Port D | Multipath 2 | Port 6 | Switch 2 | Port 7 | Switch 2 | Port b | Server 2 | Storage 1 | Pool 2 |

| Component | Importance Factor |
|---|---|
| Host 1 | 8 |
| Host 2 | 4 |
| Adapter 1 | 8 |
| Adapter 2 | 4 |
| Port A | 4 |
| Port B | 4 |
| Port C | 2 |
| Port D | 2 |
| Multipath 1 | 8 |
| Multipath 2 | 4 |
| Port 1 | 4 |
| Port 5 | 4 |
| Port 2 | 2 |
| Port 6 | 2 |
| Switch 1 | 12 |
| Switch 2 | 12 |
| Port 3 | 4 |
| Port 7 | 4 |
| Port 4 | 2 |
| Port 8 | 2 |
| Port a | 4 |
| Port b | 4 |
| Port c | 2 |
| Port d | 2 |
| Server 1 | 4 |
| Server 2 | 4 |
| Server 3 | 2 |
| Server 4 | 2 |
| Storage 1 | 8 |
| Storage 2 | 4 |
| Volume 1 | 2 |
| Volume 2 | 2 |
| Volume 3 | 2 |
| Volume 4 | 2 |
| Volume 5 | 2 |
| Volume 6 | 2 |
| Pool 1 | 4 |
| Pool 2 | 4 |
| Pool 3 | 4 |

Fig. 6

|  | Pool 1 Issue | | |
|---|---|---|---|
| Component or Device | Importance Factor | Potential Cause Factor | Problem Responsibility Factor |
| Host 1 | 8 | 4 | 0.5 |
| Host 2 | 4 | 0 | 0 |
| Adapter 1 | 8 | 4 | 0.5 |
| Adapter 2 | 4 | 0 | 0 |
| Port A | 4 | 2 | 0.5 |
| Port B | 4 | 2 | 0.5 |
| Port C | 2 | 0 | 0 |
| Port D | 2 | 0 | 0 |
| Multipath 1 | 8 | 4 | 0.5 |
| Multipath 2 | 4 | 0 | 0 |
| Port 1 | 4 | 2 | 0.5 |
| Port 5 | 4 | 2 | 0.5 |
| Port 2 | 2 | 0 | 0 |
| Port 6 | 2 | 0 | 0 |
| Switch 1 | 12 | 4 | 0.333333 |
| Switch 2 | 12 | 4 | 0.333333 |
| Port 3 | 4 | 2 | 0.5 |
| Port 7 | 4 | 2 | 0.5 |
| Port 4 | 2 | 0 | 0 |
| Port 8 | 2 | 0 | 0 |
| Port a | 4 | 2 | 0.5 |
| Port b | 4 | 2 | 0.5 |
| Port c | 2 | 0 | 0 |
| Port d | 2 | 0 | 0 |
| Server 1 | 4 | 2 | 0.5 |
| Server 2 | 4 | 2 | 0.5 |
| Server 3 | 2 | 0 | 0 |
| Server 4 | 2 | 0 | 0 |
| Storage 1 | 8 | 4 | 0.5 |
| Storage 2 | 4 | 0 | 0 |
| Volume 1 | 2 | 2 | 1 |
| Volume 2 | 2 | 2 | 1 |
| Volume 3 | 2 | 0 | 0 |
| Volume 4 | 2 | 0 | 0 |
| Volume 5 | 2 | 0 | 0 |
| Volume 6 | 2 | 0 | 0 |
| Pool 1 | 4 | 4 | 1 |
| Pool 2 | 4 | 0 | 0 |
| Pool 3 | 4 | 0 | 0 |

Fig. 7

| Component or Device | Importance Factor | Pool 1 Issue | | Result |
|---|---|---|---|---|
| | | Potential Cause Factor | Problem Responsibility Factor | |
| Host 1 | 8 | 4 | 0.5 | |
| Host 2 | 4 | 0 | 0 | |
| Adapter 1 | 8 | 4 | 0.5 | |
| Adapter 2 | 4 | 0 | 0 | |
| Port A | 4 | 2 | 0.5 | |
| Port B | 4 | 2 | 0.5 | |
| Port C | 2 | 0 | 0 | |
| Port D | 2 | 0 | 0 | |
| Multipath 1 | 8 | 4 | 0.5 | |
| Multipath 2 | 4 | 0 | 0 | |
| Port 1 | 4 | 2 | 0.5 | |
| Port 5 | 4 | 2 | 0.5 | |
| Port 2 | 2 | 0 | 0 | |
| Port 6 | 2 | 0 | 0 | |
| Switch 1 | 12 | 4 | 0.333333 | |
| Switch 2 | 12 | 4 | 0.333333 | |
| Port 3 | 4 | 2 | 0.5 | |
| Port 7 | 4 | 2 | 0.5 | |
| Port 4 | 2 | 0 | 0 | |
| Port 8 | 2 | 0 | 0 | |
| Port a | 4 | 2 | 0.5 | |
| Port b | 4 | 2 | 0.5 | |
| Port c | 2 | 0 | 0 | |
| Port d | 2 | 0 | 0 | |
| Server 1 | 4 | 2 | 0.5 | |
| Server 2 | 4 | 2 | 0.5 | |
| Server 3 | 2 | 0 | 0 | |
| Server 4 | 2 | 0 | 0 | |
| Storage 1 | 8 | 4 | 0.5 | |
| Storage 2 | 4 | 0 | 0 | |
| Volume 1 | 2 | 2 | 1 | |
| Volume 2 | 2 | 2 | 1 | |
| Volume 3 | 2 | 0 | 0 | |
| Volume 4 | 2 | 0 | 0 | |
| Volume 5 | 2 | 0 | 0 | |
| Volume 6 | 2 | 0 | 0 | |
| Pool 1 | 4 | 4 | 1 | 1 |
| Pool 2 | 4 | 0 | 0 | |
| Pool 3 | 4 | 0 | 0 | |

Fig. 8

|                     |                  | Storage 1 Issue          |                                    |        |
| ------------------- | ---------------- | ------------------------ | ---------------------------------- | ------ |
| Component or Device | Importance Factor | Potential Cause Factor | Problem Responsibility Factor | Result |
| Host 1    | 8  | 6 | 0.75     |   |
| Host 2    | 4  | 2 | 0.5      |   |
| Adapter 1 | 8  | 6 | 0.75     |   |
| Adapter 2 | 4  | 2 | 0.5      |   |
| Port A    | 4  | 3 | 0.75     |   |
| Port B    | 4  | 3 | 0.75     |   |
| Port C    | 2  | 1 | 0.5      |   |
| Port D    | 2  | 1 | 0.5      |   |
| Multipath 1 | 8 | 6 | 0.75    |   |
| Multipath 2 | 4 | 2 | 0.5     |   |
| Port 1    | 4  | 3 | 0.75     |   |
| Port 5    | 4  | 3 | 0.75     |   |
| Port 2    | 2  | 1 | 0.5      |   |
| Port 6    | 2  | 1 | 0.5      |   |
| Switch 1  | 12 | 4 | 0.333333 |   |
| Switch 2  | 12 | 4 | 0.333333 |   |
| Port 3    | 4  | 4 | 1        |   |
| Port 7    | 4  | 4 | 1        |   |
| Port 4    | 2  | 0 | 0        |   |
| Port 8    | 2  | 0 | 0        |   |
| Port a    | 4  | 4 | 1        |   |
| Port b    | 4  | 4 | 1        |   |
| Port c    | 2  | 0 | 0        |   |
| Port d    | 2  | 0 | 0        |   |
| Server 1  | 4  | 4 | 1        |   |
| Server 2  | 4  | 4 | 1        |   |
| Server 3  | 2  | 0 | 0        |   |
| Server 4  | 2  | 0 | 0        |   |
| Storage 1 | 8  | 8 | 1        | 1 |
| Storage 2 | 4  | 0 | 0        |   |
| Volume 1  | 2  | 2 | 1        |   |
| Volume 2  | 2  | 2 | 1        |   |
| Volume 3  | 2  | 2 | 1        |   |
| Volume 4  | 2  | 0 | 0        |   |
| Volume 5  | 2  | 0 | 0        |   |
| Volume 6  | 2  | 2 | 1        |   |
| Pool 1    | 4  | 4 | 1        |   |
| Pool 2    | 4  | 2 | 0.5      |   |
| Pool 3    | 4  | 0 | 0        |   |

Fig. 9

|  | | Port 5 Issue | | |
|---|---|---|---|---|
| Component or Device | Importance Factor | Potential Cause Factor | Problem Responsibility Factor | Result |
| Host 1 | 8 | 4 | 0.5 | |
| Host 2 | 4 | 0 | 0 | |
| Adapter 1 | 8 | 4 | 0.5 | |
| Adapter 2 | 4 | 0 | 0 | |
| Port A | 4 | 0 | 0 | |
| Port B | 4 | 4 | 1 | 1 |
| Port C | 2 | 0 | 0 | |
| Port D | 2 | 0 | 0 | |
| Multipath 1 | 8 | 4 | 0.5 | |
| Multipath 2 | 4 | 0 | 0 | |
| Port 1 | 4 | 0 | 0 | |
| Port 5 | 4 | 4 | 1 | 1 |
| Port 2 | 2 | 0 | 0 | |
| Port 6 | 2 | 0 | 0 | |
| Switch 1 | 12 | 0 | 0 | |
| Switch 2 | 12 | 8 | 0.666667 | |
| Port 3 | 4 | 0 | 0 | |
| Port 7 | 4 | 3 | 0.75 | |
| Port 4 | 2 | 0 | 0 | |
| Port 8 | 2 | 1 | 0.5 | |
| Port a | 4 | 0 | 0 | |
| Port b | 4 | 3 | 0.75 | |
| Port c | 2 | 0 | 0 | |
| Port d | 2 | 1 | 0.5 | |
| Server 1 | 4 | 0 | 0 | |
| Server 2 | 4 | 3 | 0.75 | |
| Server 3 | 2 | 0 | 0 | |
| Server 4 | 2 | 1 | 0.5 | |
| Storage 1 | 8 | 3 | 0.375 | |
| Storage 2 | 4 | 1 | 0.25 | |
| Volume 1 | 2 | 1 | 0.5 | |
| Volume 2 | 2 | 1 | 0.5 | |
| Volume 3 | 2 | 1 | 0.5 | |
| Volume 4 | 2 | 1 | 0.5 | |
| Volume 5 | 2 | 0 | 0 | |
| Volume 6 | 2 | 0 | 0 | |
| Pool 1 | 4 | 2 | 0.5 | |
| Pool 2 | 4 | 1 | 0.25 | |
| Pool 3 | 4 | 1 | 0.25 | |

Fig. 10

PROBLEM DIAGNOSIS IN COMPLEX SAN ENVIRONMENTS

BACKGROUND

Field of the Invention

This invention relates to systems and methods for diagnosing problems in complex storage-area-network (SAN) environments.

Background of the Invention

Today, enterprises use databases to store and process massive amounts of data. Traditionally, statically-provisioned storage devices were directly connected to database servers to satisfy an enterprise's requirements with respect to storage capacity, throughput, and bandwidth. However, configuring storage in this way was often characterized by the underutilization of resources, poor allocation of resources, and/or high administration costs. This led to the development of network-attached architectures made up of multiple application servers connected to a consolidated and virtualized pool of storage devices. These network-attached architectures are typically referred to as storage area networks (SANs).

Unfortunately, despite their advantages, storage area networks are often very complex and difficult to understand and/or troubleshoot. In some cases, storage area networks may include hundreds or even thousands of components (e.g., host systems, host adapters, switches, storage subsystems, storage devices, etc.) coupled together in different configurations. No obvious hierarchy typically exists among components in a storage area network.

When a problem occurs in a storage area network, alerts may be generated by components of the storage area network at or near the same time. To diagnose or determine a root cause of a problem, system administrators may need to analyze large numbers of logs, synchronize inconsistent timestamps, and correlate failures between related components. This process is tedious and typically requires a significant amount of specialized experience working with storage area networks.

In view of the foregoing, what are needed are systems and methods to more effectively and efficiently diagnose problems in complex storage area networks. Ideally, such systems and methods will enable administrators to quickly narrow down potential causes of problems in such networks.

SUMMARY

The invention has been developed in response to the present state of the art and, in particular, in response to the problems and needs in the art that have not yet been fully solved by currently available systems and methods. Accordingly, systems and methods have been developed to more effectively and efficiently diagnose problems in storage networks. The features and advantages of the invention will become more fully apparent from the following description and appended claims, or may be learned by practice of the invention as set forth hereinafter.

Consistent with the foregoing, a method to more effectively and efficiently diagnose problems in a storage network is disclosed. In one embodiment, such a method includes generating, for a storage network, a resource map that identifies components therein. For each component in the resource map, the method identifies an importance factor that indicates the component's importance in the storage network. When a problem is detected in the storage network, the method identifies, for each component in the resource map, a potential cause factor that indicates how likely the component is to have caused the problem. The method also calculates, for each component in the resource map, a problem responsibility factor to indicate to what extent the component is responsible for the problem.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5 is a table showing components and paths associated with the resource map of FIG. 4;

FIG. 6 is a table showing an importance factor for each component in the resource map of FIG. 4;

FIG. 7 is a table showing a potential cause factor and problem responsibility factor for each component in the resource map of FIG. 4 for a problem detected in "pool 1";

FIG. 8 is a table showing the component with the largest problem responsibility factor for a problem detected in "pool 1";

FIG. 9 is a table showing a potential cause factor and a problem responsibility factor for each component in the resource map of FIG. 4 for a problem detected in "storage 1", as well as the component with the largest problem responsibility factor and importance factor;

FIG. 10 is a table showing a potential cause factor and a problem responsibility factor for each component in the resource map of FIG. 4 for a problem detected in "port 5", as well as components with the largest problem responsibility factor and importance factor.

DETAILED DESCRIPTION

Figure 1:
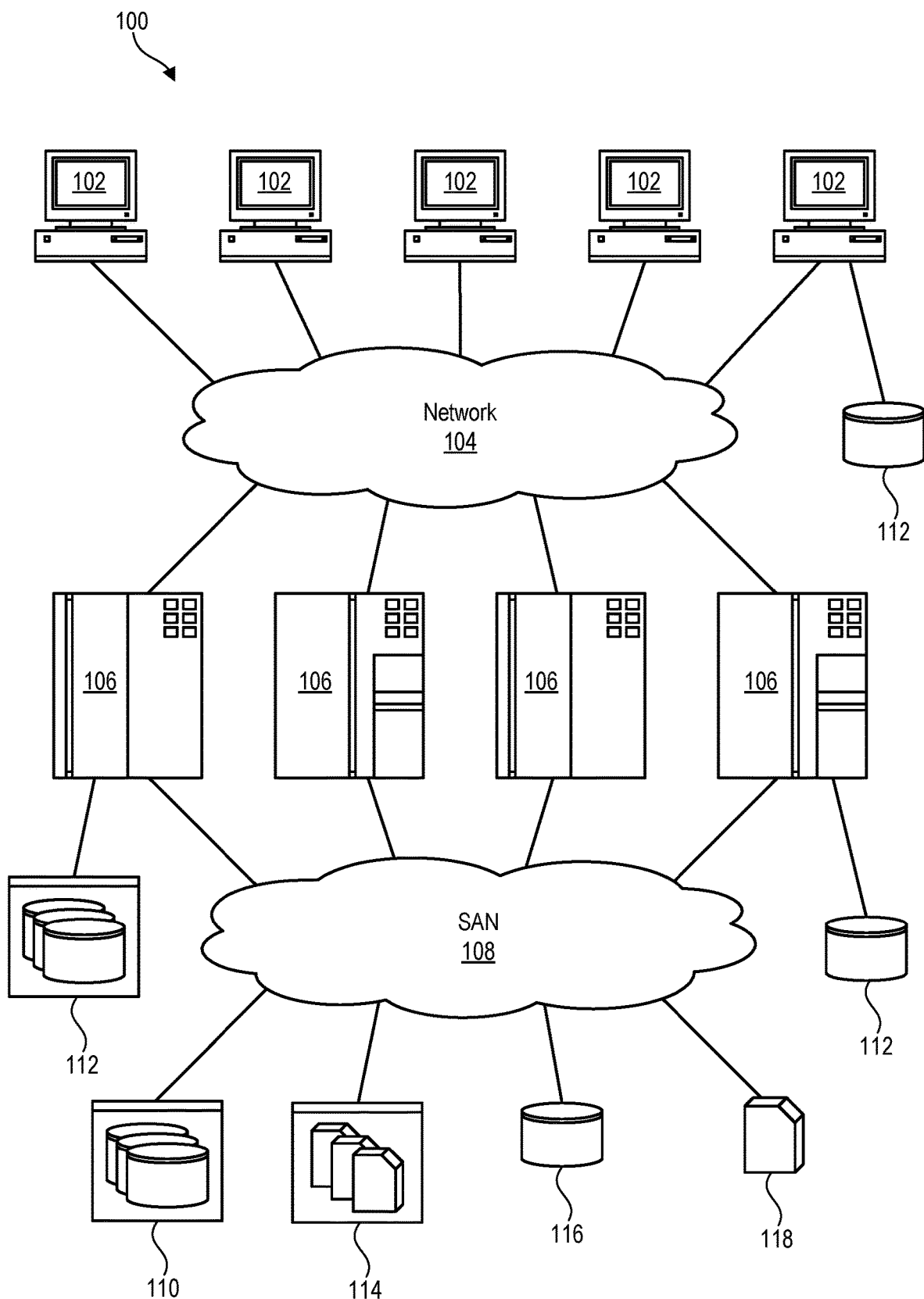
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 114, individual hard-disk drives 116 or solid-state drives 116, tape drives 118, CD-ROM libraries, or the like. To access a storage system 110, 114, 116, 118, a host system 106 may communicate over physical connections from one or more ports on the host 106 to one or more ports on the storage system 110, 114, 116, 118. A connection may be through a switch, fabric, direct connection, or the like. In certain embodiments, the servers 106 and storage systems 110, 114, 116, 118 may communicate using a networking standard or protocol such as Fibre Channel (FC) or iSCSI.

Figure 2:
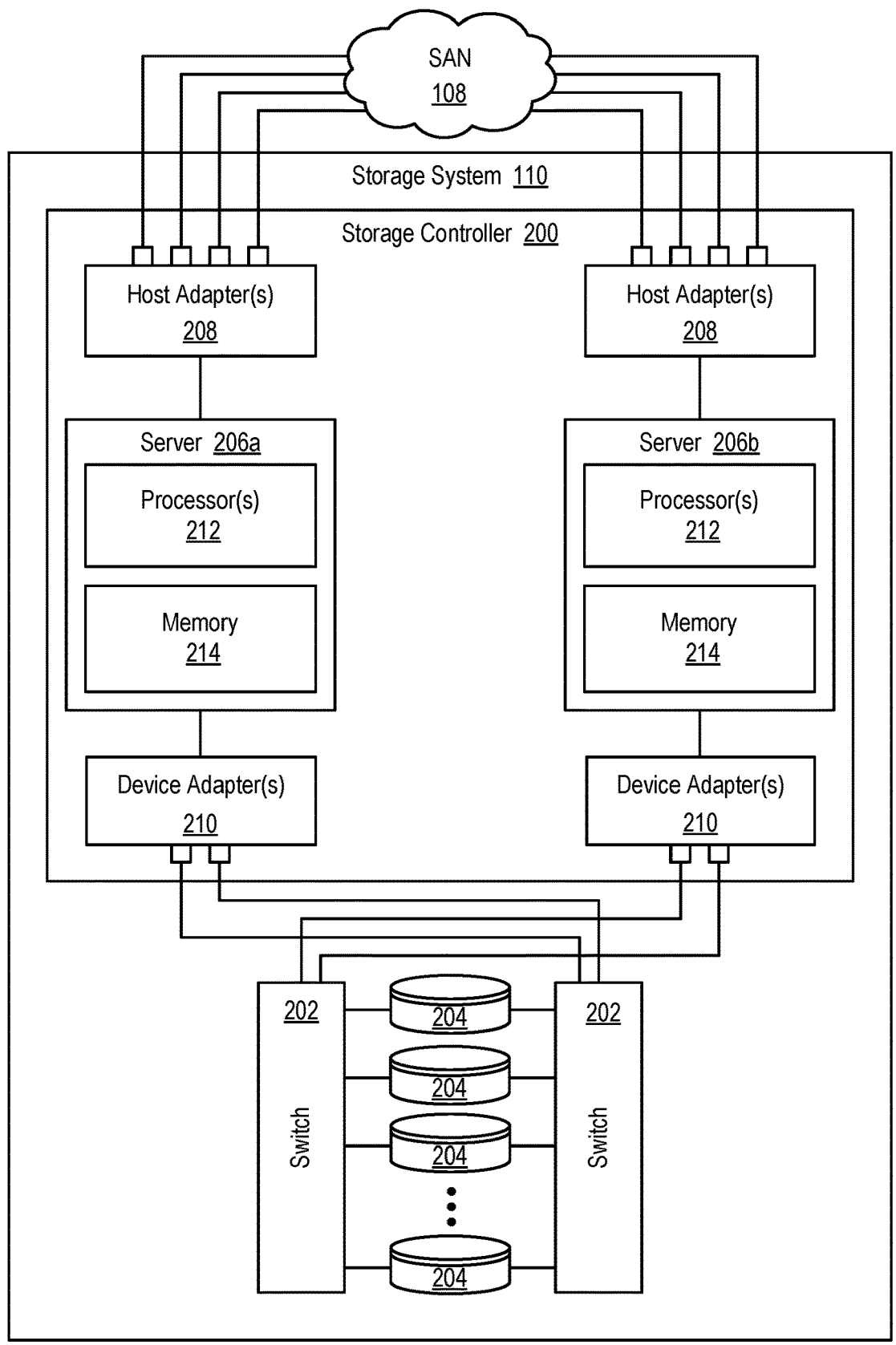
FIG. 2 is a high-level block diagram showing one embodiment of a storage system for use in the network environment of FIG. 1.

Referring to FIG. 2, one example of a storage system 110 containing an array of hard-disk drives 204 and/or solid-state drives 204 is illustrated. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the storage system 110. For example, in certain configurations, a first server 206*a* may handle I/O to even LSSs, while a second server 206*b* may handle I/O to odd LSSs. These servers 206*a*, 206*b* may provide redundancy to ensure that data is always available to connected hosts 106. Thus, when one server 206*a* fails, the other server 206*b* may pick up the I/O load of the failed server 206*a* to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes hosted in the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
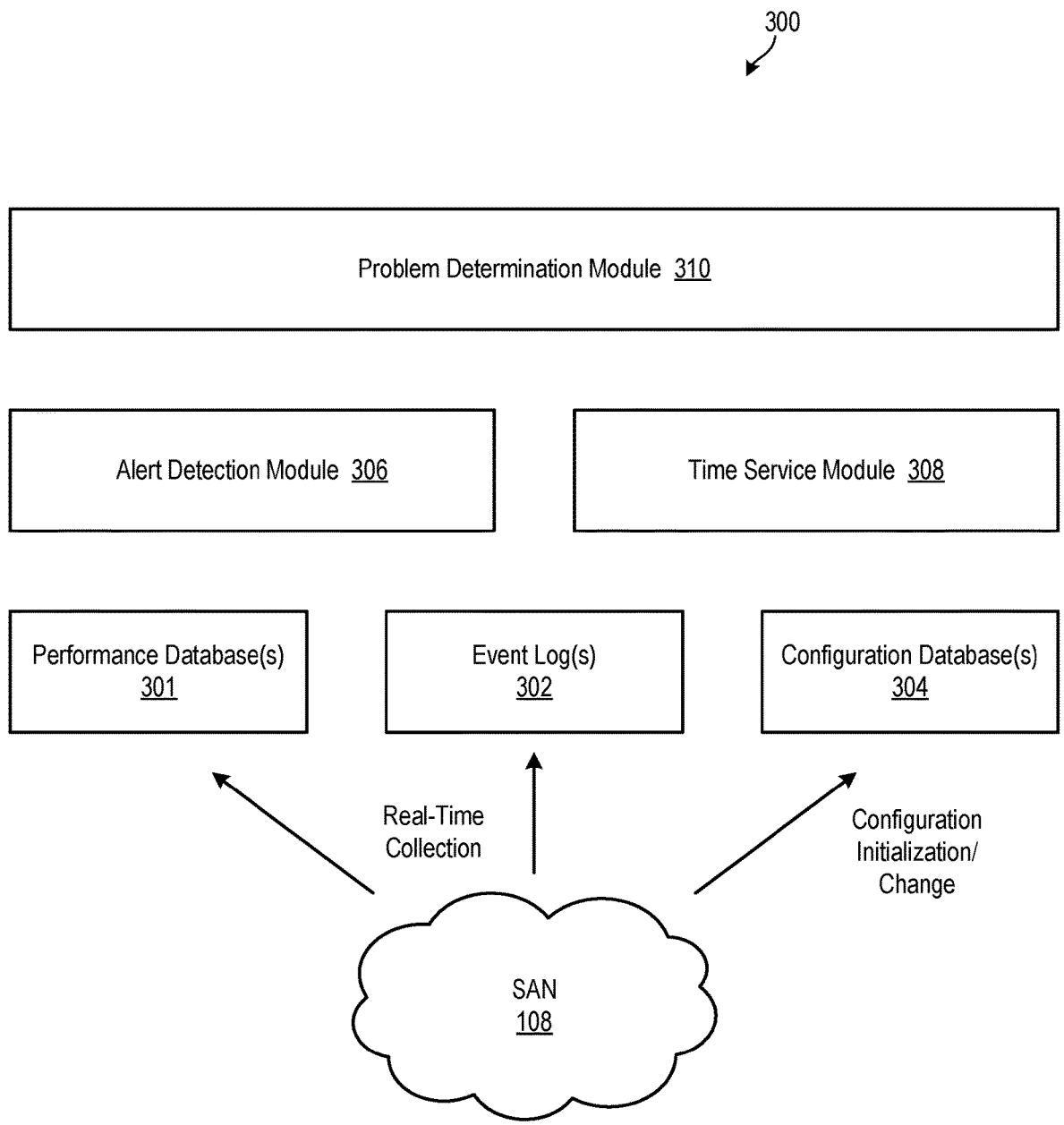
FIG. 3 is a high-level block diagram showing an overall architecture for determining problems in a storage area network.

Referring to FIG. 3, as previously mentioned, storage area networks 108 are often very complex and difficult to understand and/or troubleshoot. In some cases, storage area networks 108 may include hundreds or thousands of components (e.g., host systems 106, host adapters 208, switches 202, storage devices 204, etc.) coupled together in various configurations. These components may be hardware components, software components, or combinations thereof. No obvious hierarchy typically exists among components in a storage area network 108.

When a problem occurs in a storage area network 108, alerts may be generated on multiple components of the storage area network 108 at or near the same time. To diagnose and determine a root cause of a problem, system administrators may need to analyze large numbers of logs, synchronize inconsistent timestamps, and correlate failures between related components. This process is often tedious and typically requires a significant amount of specialized experience working with storage area networks 108.

Thus, systems and methods are needed to more effectively and efficiently diagnose problems in storage area networks 108. Ideally, such systems and methods will enable administrators to quickly narrow down potential causes of problems in such networks 108.

FIG. 3 shows one example of an architecture 300 that may be used to effectively and efficiently diagnose problems in a storage area network 108. As shown in FIG. 3, one or more performance databases 300 may be used to collect real-time performance information associated with a storage area network 108, including performance associated with individual components of the storage area network 108. Similarly, one or more event logs 302 may be used to record events that occur within the storage area network 108. Events may be generated by various components of the storage area network 108 and recorded in the event logs(s) 302. One or more configuration databases 304 may be used to store a configuration of the storage area network 108. This configuration may reflect an initial configuration and/or changes occurring to the storage area network 108 after an initial configuration.

The architecture 300 may further include an alert detection module 306 to detect errors or other problems in the storage area network 108. These may include problems with performance, as may be recorded in the performance database(s) 301, and/or problems detected in association with particular events, as may be recorded in the event logs(s) 302. A time service module 308 may synchronize timestamps across components in the storage area network 108. Because a problem in a storage area network 108 may involve multiple components, each of which may generate events that are stored in event logs(s) 302, the time service module 308 may generate time stamps associated with the events so the events may be correlated with one another. Using information provided by the alert detection module 306 and the time service module 308, a problem determination module 310 may attempt to determine a root cause or likely root cause of a problem in the storage area network 108. The manner in which the problem determination module 310 may work will be discussed in more detail hereafter.

Figure 4:
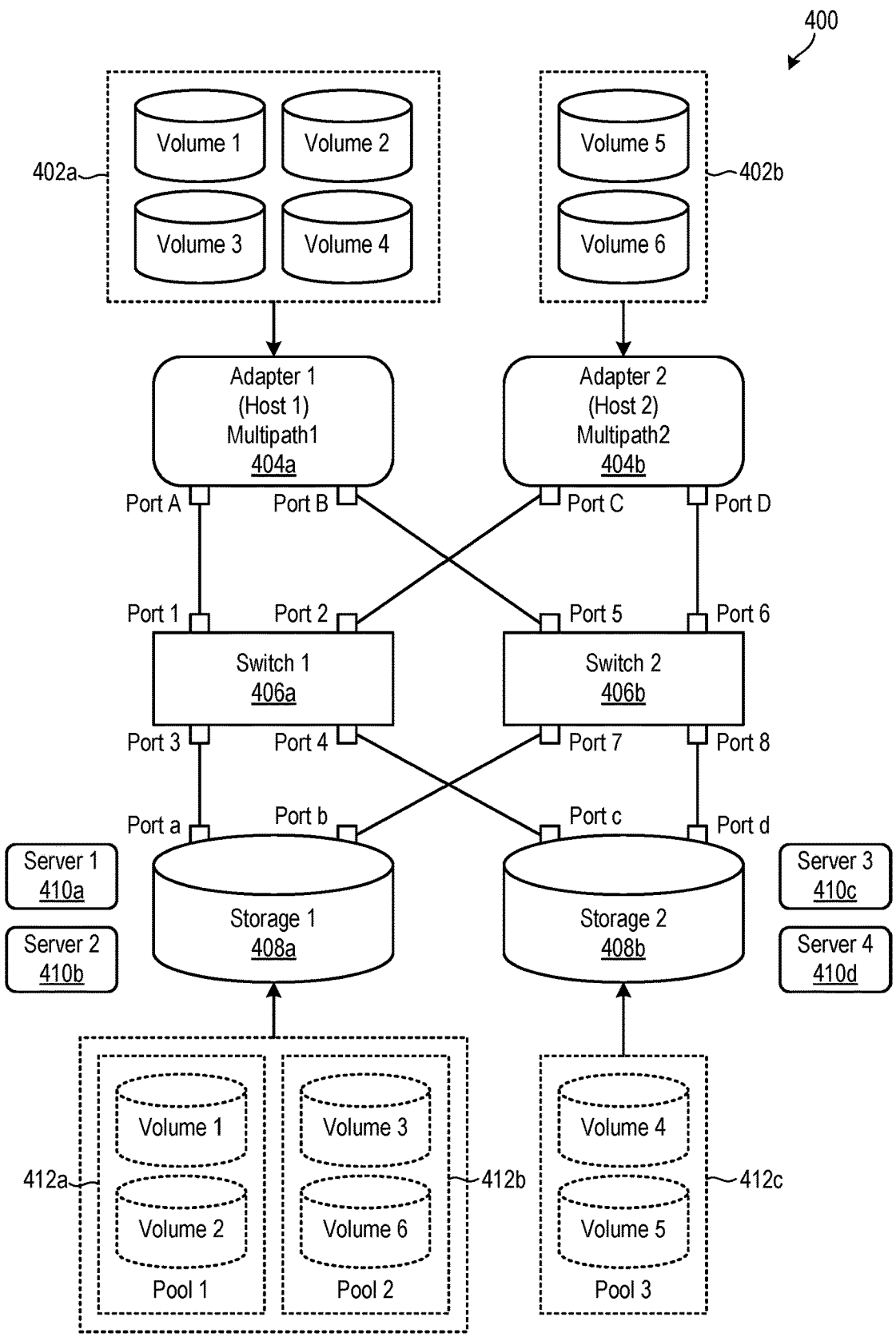
FIG. 4 shows an exemplary resource map describing components and paths within a storage area network.

Referring to FIG. 4, in order to effectively and efficiently diagnose problems in a storage area network 108, systems and methods in accordance with the invention may initially discover components in a storage area network 108 and build a resource map 400 of the components and their relationships with one another. FIG. 4 shows one example of a resource map 400 that shows components as well as communication paths through a storage area network 108.

In the illustrated example, the resource map 400 includes various logical volumes 402. A first set of logical volumes 402a are associated with a first host adapter 404a. The first host adapter 404a is associated with a first host system and first multipath software. A second set of logical volumes 402b are associated with a second host adapter 404b. The second host adapter 404b is associated with a second host system and second multipath software.

The first and second host adapters 404 communicate with switches 406a, 406b by way of various ports. These switches 406a, 406b, in turn, communicate with various storage subsystems 408a, 408b, each of which may be associated with one or more storage pools 412 (i.e., pools 412 of storage drives 204). In the illustrated embodiment, the logical volumes 402 are shown within the storage pools 412 to indicate on which pool 412 of backend physical storage drives 204 the logical volumes 402k reside. As shown, each storage subsystem 408a, 408b may have various servers 410 associated therewith, such as the servers 206a, 206b described in association with FIG. 2. As explained in association with FIG. 2, I/O associated with a logical volume 402 may be routed through either server 410 of the storage subsystems 408a, 408b.

Referring to FIG. 5, a table 500 is provided showing components and paths of the resource map of FIG. 4. Each row of the table 500 represents an end-to-end path through the storage area network 108 of FIG. 4, starting from a logical volume 402 in the left-hand column and ending with a storage pool 412 on the right hand column. As shown, I/O to each logical volume 402 may flow through multiple paths of the storage area network 108. In this example, each path includes a logical volume 402, host system 106, host adapter 404, host adapter ports, multipath software, switch 406, switch ports, storage server 410, storage subsystem 408, and storage pool 412.

Referring to FIG. 6, a table 600 is illustrated showing an importance factor for each component in the resource map 400 of FIG. 4. In order to effectively and efficiently diagnose problems in a storage area network 108, the problem determination module 310 may identify, for each component in the resource map 400, an importance factor that indicates how important the component is in the storage area network 108. Stated otherwise, the importance factor may indicate how destructive it would be to the storage area network 108 for the associated component to fail. In certain embodiments, the importance factor is an integer value as shown in FIG. 6 and may be established/updated each time the configuration of the storage area network 108 is initialized or changed. The importance factors shown in FIG. 6 are simply examples and are not intended to be limiting.

The magnitude of the importance factor may reflect two concepts: (1) the logical or physical paths that pass through the component; and (2) whether the component contains other components. In other words, components that have more paths passing therethrough (see FIG. 5, for example) will have a larger importance factor. Also, components that contain other components (a storage subsystem 408 that contains multiple storage servers 410, for example) will tend to have larger importance factors. In some cases, the importance factor of a component will be the sum of the importance factors of the components that it contains.

Referring to FIG. 7, when a problem (e.g., error) is detected in the storage area network 108, the problem determination module 310 may identify, for each component in the resource map 400, a potential cause factor that indicates how likely the component is to have caused the problem. In certain embodiments, the problem is detected by a host application for a particular logical volume 402 on a host system 106. In certain embodiments, in order to calculate the potential cause factor, the problem determination module 310 may traverse the resource map 400 for each logical volume 402 that has generated an alert (as detected by the alert detection module 306). For each logical volume 402 that has generated an alert, the problem determination module 310 may traverse paths leading from the logical volume 402 to the backend storage. Each time a component is encountered while traversing the resource map 400, its potential cause factor may be incremented by a certain amount, such as one (assuming the potential cause factor is represented as an integer value). In certain embodiments, if event logs(s) 302 have captured alerts (e.g., errors) for components in the resource map 400, for each component that has a potential cause factor of greater than zero, the potential cause factor may be reduced to zero if no alerts were recorded for the component in the event logs(s) 302. Similarly, if performance logs have captured performance data for components in the resource map 400, for each component that has a potential cause factor of greater than zero, the potential cause factor may, in certain embodiments, be reduced to zero if no performance issues were recorded for the component in the performance logs.

As shown in FIG. 7, the problem determination module 310 may also calculate, for each component in the resource map 400, a problem responsibility factor to indicate to what extent the component is held responsible for the problem. In certain embodiments, the problem responsibility factor is represented as a decimal value. This decimal value may, in certain embodiments, be generated by dividing the potential cause factor of a component by its importance factor.

Referring to FIG. 8, once the problem responsibility factor is calculated for each component, the problem determination module 310 may identify the component with the largest problem responsibility factor. This component may be assigned primary responsibility for the problem or at least indicate where the problem is most likely to have originated or occurred. In the example shown in FIG. 8, "Pool 1" is assigned primary responsibility for a problem because, after performing the analysis previously described, it has the largest problem responsibility factor.

If, after performing the analysis previously described, multiple components share the same largest problem responsibility factor, the problem determination module 310 may sort the multiple components by importance factor. That is, of the components with the largest problem responsibility factor, the component with the largest importance factor may be assigned primary responsibility for the problem. For example, in the scenario shown in FIG. 9 where multiple components have the same largest problem responsibility factor, "Storage 1" is assigned primary responsibility for a problem because it has the largest importance factor.

Similarly, in the event multiple components share the largest problem responsibility factor and have the same importance factor, the components may be sorted by timestamp. That is, of the components with the same largest problem responsibility factor and the same importance factor, the component having the alert with the earliest timestamp may be assigned primary responsibility for the problem. For example, in the scenario shown in FIG. 10 where multiple components have the same largest problem responsibility factor and the same importance factor, "Port 5" is assigned primary responsibility for a problem because it has the earliest timestamp.

Figure 11:
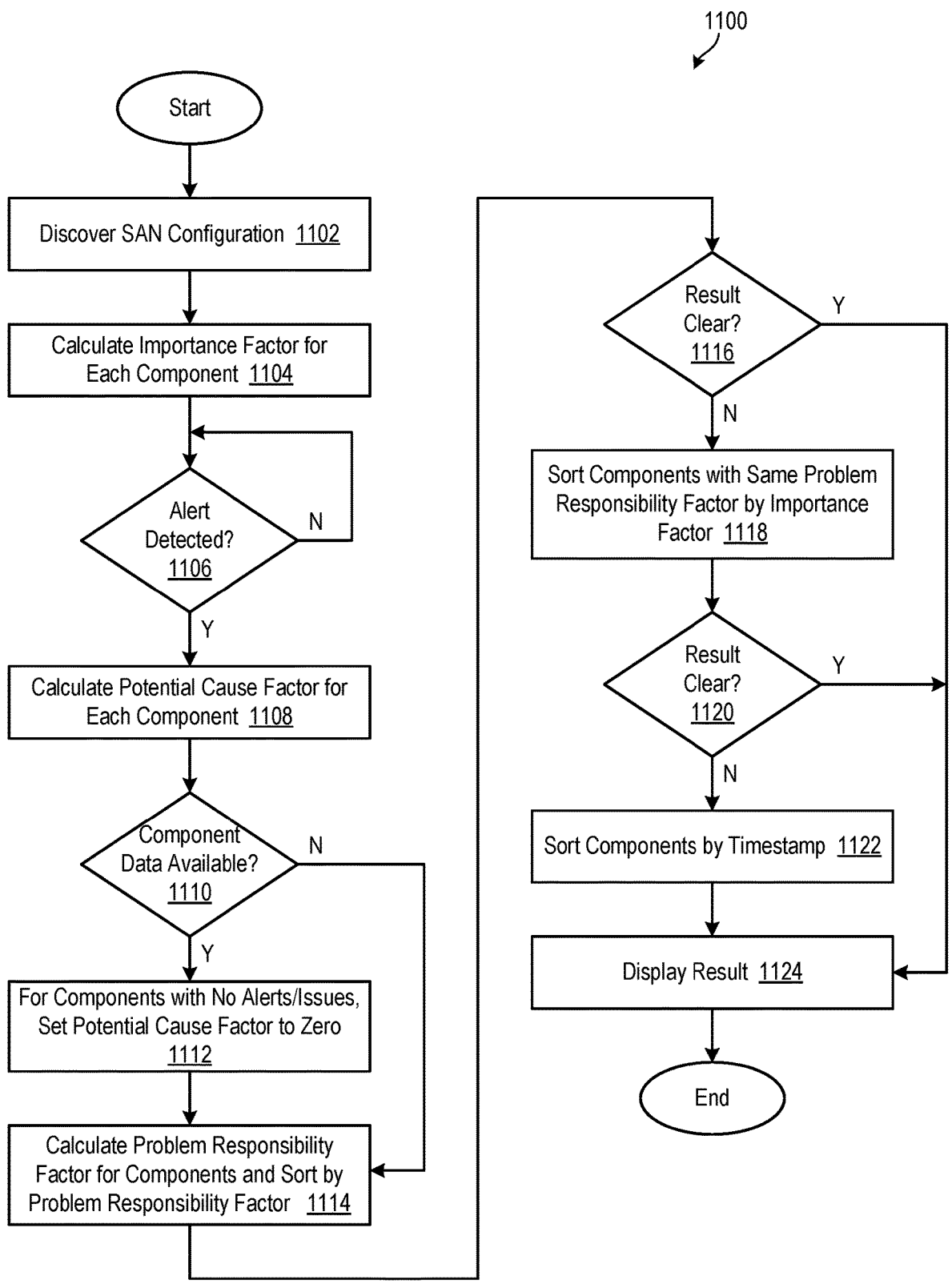
FIG. 11 is a flow diagram showing one embodiment of a method for effectively and efficiently diagnosing problems in a storage area network.

Referring to FIG. 11, one embodiment of a method 1100 for effectively and efficiently diagnosing a problem in a storage area network 108 is illustrated. Such a method 1100 may, in certain embodiments, be executed by the problem determination module 310 previously described. As shown, the method 1100 initially discovers 1102 the configuration of the storage area network 108. This may include discovering 1102 components in the storage area network 108 as well as end-to-end paths through the storage area network 108 from logical volumes 402 to backend storage pools 412. The method 1100 then calculates 1104 an importance factor for each component in the storage area network 108.

At this point, the method 1100 may wait 1106 for an alert indicating there is a problem in the storage area network 108. If, at step 1106, an alert is detected, the method 1100 calculates 1108 a potential cause factor for each component in the storage area network 108. The method 1100 further determines 1110 if component data is available (e.g., if event or performance logs(s) are available that have captured alerts or performance data for components in the storage area network 108). If so, the method 1100 may set 1112 the potential cause factor to zero for components with no recorded alerts or issues with performance.

At this point, the method 1100 calculates 1114 a problem responsibility factor for each component in the storage area network 108. As previously mentioned, in certain embodiments, this may be accomplished by dividing the potential cause factor for each component by its importance factor. The method 1100 then sorts 1114 the components by the magnitude of their problem responsibility factors.

If, at step 1116, the result is clear, meaning that there is a single component with the largest problem responsibility factor, the method 1100 displays 1124 the result. This component is assigned primary responsibility for the problem in the storage area network 108. If, on the other hand, the result is not clear, meaning that multiple components share the same largest problem responsibility factor, the method 1100 sorts 1118 the components with the largest problem responsibility factor by the magnitude of their importance factor.

If, at step 1120, the result is clear, meaning that there is a single component with the largest problem responsibility factor and the largest importance factor, the method 1100 displays 1124 the result. If, on the other hand, the result is not clear, meaning that multiple components have the same largest problem responsibility factor and the same largest importance factor, the method 1100 sorts 1122 the components by timestamp. In other words, of the components with the same largest problem responsibility factor and the same largest importance factor, the component having an alert with the earliest timestamp may be assigned primary responsibility for the problem. The method 1100 may then display 1124 the result.

The systems and methods disclosed herein have been discussed primarily with respect to determining problems in storage area networks (SANs). However, the same or similar systems and methods may also be used to diagnose or determine problems in components of other types of storage networks, such as network attached storage (NAS) networks or the like. Thus, the phase "storage network" may be used herein to encompass storage area networks, network attached storage networks, or other types of storage networks.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to more effectively and efficiently diagnose problems in a storage network, the method comprising:
    generating, for a storage network, a resource map that identifies components in the storage network;
    identifying, for each component in the resource map, an importance factor that indicates how important the component is in the storage network;
    detecting a problem in the storage network;
    identifying, for each component in the resource map, a potential cause factor that indicates how likely the component is to have caused the problem; and
    calculating, for each component in the resource map, a problem responsibility factor to indicate to what extent the component is held responsible for the problem, wherein the problem responsibility factor is a function of the potential cause factor and the importance factor.

2. The method of claim 1, wherein the problem responsibility factor is represented as a decimal value.

3. The method of claim 1, wherein calculating the problem responsibility factor for each component comprises calculating the problem responsibility factor by dividing the potential cause factor for each component by the importance factor for each component.

4. The method of claim 1, further comprising sorting the components in the resource map by largest problem responsibility factor.

5. The method of claim 4, further comprising, in the event multiple components in the resource map have the same largest problem responsibility factor, sorting the multiple components by largest importance factor.

6. The method of claim 5, further comprising, in the event multiple components in the resource map have the same largest problem responsibility factor and the same largest importance factor, sorting the multiple components by timestamp.

7. The method of claim 1, wherein the storage network is one of a storage area network and a network attached storage network.

8. A computer program product to more effectively and efficiently diagnose problems in a storage network, the computer program product comprising a computer-readable medium having computer-usable program code embodied therein, the computer-usable program code configured to perform the following when executed by at least one processor:
- generate, for a storage network, a resource map that identifies components in the storage network;
- identify, for each component in the resource map, an importance factor that indicates how important the component is in the storage network;
- detect a problem in the storage network;
- identify, for each component in the resource map, a potential cause factor that indicates how likely the component is to have caused the problem; and
- calculate, for each component in the resource map, a problem responsibility factor to indicate to what extent the component is held responsible for the problem, wherein the problem responsibility factor is a function of the potential cause factor and the importance factor.

9. The computer program product of claim 8, wherein the problem responsibility factor is represented as a decimal value.

10. The computer program product of claim 8, wherein calculating the problem responsibility factor for each component comprises calculating the problem responsibility factor by dividing the potential cause factor for each component by the importance factor for each component.

11. The computer program product of claim 8, wherein the computer-usable program code is further configured to sort the components in the resource map by largest problem responsibility factor.

12. The computer program product of claim 11, wherein the computer-usable program code is further configured to, in the event multiple components in the resource map have the same largest problem responsibility factor, sort the multiple components by largest importance factor.

13. The computer program product of claim 12, wherein the computer-usable program code is further configured to, in the event multiple components in the resource map have the same largest problem responsibility factor and the same largest importance factor, sort the multiple components by timestamp.

14. The computer program product of claim 8, wherein the computer-usable program code is further configured to identify the component in the resource map with the largest problem responsibility factor.

15. A system to more effectively and efficiently diagnose problems in a storage network, the system comprising:
- at least one processor;
- at least one memory device coupled to the at least one processor and storing instructions for execution on the at least one processor, the instructions causing the at least one processor to:
  - generate, for a storage network, a resource map that identifies components in the storage network;
  - identify, for each component in the resource map, an importance factor that indicates how important the component is in the storage network;
  - detect a problem in the storage network;
  - identify, for each component in the resource map, a potential cause factor that indicates how likely the component is to have caused the problem; and
  - calculate, for each component in the resource map, a problem responsibility factor to indicate to what extent the component is held responsible for the problem, wherein the problem responsibility factor is a function of the potential cause factor and the importance factor.

16. The system of claim 15, wherein the problem responsibility factor is represented as a decimal value.

17. The system of claim 15, wherein calculating the problem responsibility factor for each component comprises calculating the problem responsibility factor by dividing the potential cause factor for each component by the importance factor for each component.

18. The system of claim 15, wherein the instructions further cause the at least one processor to sort the components in the resource map by largest problem responsibility factor.

19. The system of claim 18, wherein the instructions further cause the at least one processor to, in the event multiple components in the resource map have the same largest problem responsibility factor, sort the multiple components by largest importance factor.

20. The system of claim 19, wherein the instructions further cause the at least one processor to, in the event multiple components in the resource map have the same largest problem responsibility factor and the same largest importance factor, sort the multiple components by timestamp.

* * * * *